(12) United States Patent
Anantha et al.

(10) Patent No.: US 10,521,444 B2
(45) Date of Patent: Dec. 31, 2019

(54) DATA RETRIEVAL BASED ON FIELD SIZE

(71) Applicant: SAP SE, Walldorf (DE)

(72) Inventors: Hemanth Rajeswari Anantha, Bangalore (IN); Prithvi Krishna, Bangalore (IN); Panish Ramakrishna, Bangalore (IN)

(73) Assignee: SAP SE, Walldorf (DE)

( * ) Notice: Subject to any disclaimer, the term of this patent is extended or adjusted under 35 U.S.C. 154(b) by 337 days.

(21) Appl. No.: 15/386,988

(22) Filed: Dec. 21, 2016

(65) Prior Publication Data

US 2018/0173772 A1 Jun. 21, 2018

(51) Int. Cl.
*G06F 16/248* (2019.01)
*G06F 16/951* (2019.01)
*H04L 29/08* (2006.01)

(52) U.S. Cl.
CPC .......... *G06F 16/248* (2019.01); *G06F 16/951* (2019.01); *H04L 67/2842* (2013.01); *H04L 67/02* (2013.01); *H04L 67/32* (2013.01)

(58) Field of Classification Search
CPC . G06F 16/248; G06F 16/951; H04L 67/2842; H04L 67/02; H04L 67/32
See application file for complete search history.

(56) References Cited

U.S. PATENT DOCUMENTS

| | | | | |
|---|---|---|---|---|
| 6,757,830 B1 * | 6/2004 | Tarbotton | ............. | G06Q 10/107 709/226 |
| 6,763,496 B1 * | 7/2004 | Hennings | ............... | G06F 16/957 715/205 |
| 9,374,395 B2 * | 6/2016 | Barton | ..................... | H04L 67/06 |
| 2002/0033844 A1 * | 3/2002 | Levy | ........................ | G06F 21/10 715/744 |
| 2002/0099785 A1 * | 7/2002 | Teeple | .............. | H04L 29/06027 709/214 |
| 2007/0088866 A1 * | 4/2007 | Day | ........................ | G06F 13/28 710/22 |
| 2007/0208669 A1 * | 9/2007 | Rivette | .................. | G06Q 10/10 705/59 |
| 2011/0191290 A1 * | 8/2011 | Gutlapalli | ............... | G06F 16/00 707/610 |
| 2011/0238621 A1 * | 9/2011 | Agrawal | ............... | G06F 16/273 707/610 |
| 2012/0284356 A1 * | 11/2012 | Luna | ................... | G06F 16/9574 709/213 |

(Continued)

*Primary Examiner* — Cam Y T Truong
(74) *Attorney, Agent, or Firm* — Schwegman Lundberg & Woessner, P.A.

(57) ABSTRACT

Example embodiments for accessing data are described. In an example embodiment, a request is received for a data record including multiple data fields. Based on location information for each field from a metadata file, each field of a first portion of the multiple fields is retrieved from a local data store, with each of the fields of the first portion having a corresponding size less than a threshold size. Each retrieved field of the first portion may be presented to a user, along with a field indicator for at least one field of a second portion of the multiple fields, with each of the fields of the second portion having a corresponding size at least as large as the threshold size. In response to a selection of the field indicator, at least one field of the second portion may be retrieved and presented to the user.

20 Claims, 8 Drawing Sheets

(56) References Cited

U.S. PATENT DOCUMENTS

| | | | |
|---|---|---|---|
| 2013/0024442 A1* | 1/2013 | Santosuosso | G06F 16/245 707/720 |
| 2015/0277767 A1* | 10/2015 | Hamano | G06F 3/0665 711/114 |
| 2018/0115903 A1* | 4/2018 | Badic | H04W 16/14 |

* cited by examiner

DATA RETRIEVAL BASED ON FIELD SIZE

FIELD

The present application relates generally to data processing and, more specifically in an example embodiment, to automatically basing a process or method of data retrieval on a size of a data field being retrieved.

BACKGROUND

Databases and data stores, such as those containing data relating to materials, products, services, and the like, may include a plurality of data records (or files), with each record including multiple fields, and with each field containing data for a particular type of data associated with the record. For example, a data record for a particular replacement component of a machine may include fields for the name of the part, the part or "stock keeping unit" (SKU) number for the part, a text description of the part, one or more still images of the part, audio and/or video associated with the part (e.g., video showing installation of the part in the machine), and so on. Moreover, a record may contain more than one version of a field (e.g., multiple description fields for different languages, multiple video fields for different video formats, etc.). Consequently, the size of the various types of data fields of each record may vary widely, such as from a few bytes to several megabytes, possibly representing several different data formats.

As a result of the widely different sizes of data fields within a data record, as well as the potentially large overall size of each record, storage and synchronization of a data record for access by multiple applications may be difficult, complicated, and inefficient, as each application typically stores a copy of the complete record in a data store specifically associated with the application (e.g., a memory-based database, a Hadoop® Distributed File System (HDFS), a cloud storage service, or one or more hard disk devices or other data storage devices). Moreover, each update to a field (especially a large field) at a data source for the record may require the application to retrieve the new version of the field from that data source, thus increasing overall communication network traffic between the data source and the data stores of the various applications accessing those records.

BRIEF DESCRIPTION OF DRAWINGS

The present disclosure is illustrated by way of example and not limitation in the figures of the accompanying drawings, in which like reference numbers indicate similar elements.

DETAILED DESCRIPTION

In the following description, for purposes of explanation, numerous specific details are set forth to provide an understanding of various example embodiments of the present subject matter. It will be evident, however, to those skilled in the art, that example embodiments of the present subject matter may be practiced without these specific details.

Figure 1:
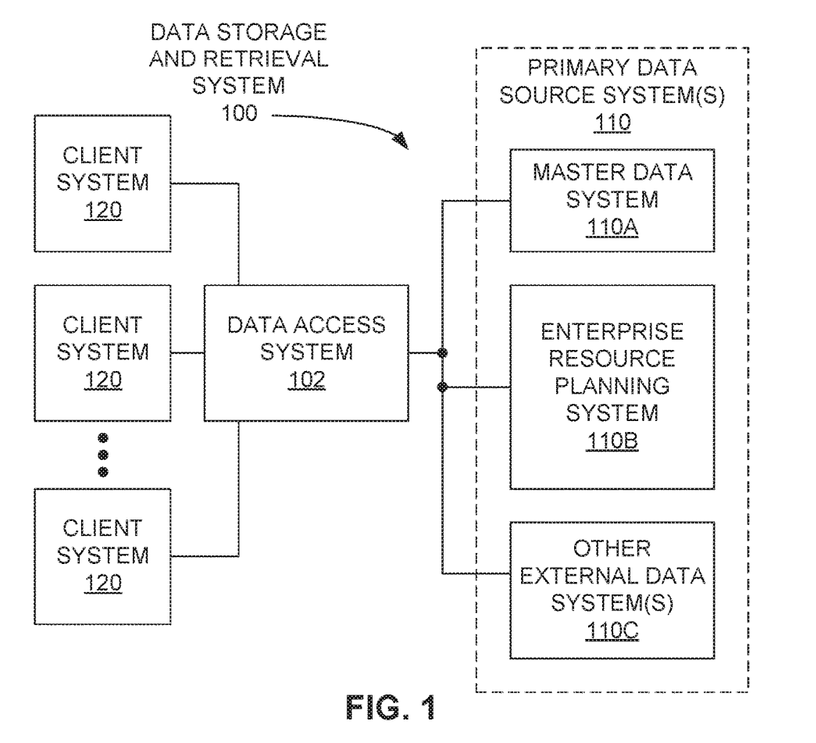
FIG. 1 is a block diagram of an example data storage and retrieval system.

FIG. 1 is a block diagram of an example data storage and retrieval system 100 that may include a data access system 102 to which one or more client systems 120 may be communicatively coupled. Generally, the data access system 102 is configured to retrieve data from one or more primary data source systems 110 (which serve as remote data stores) and serve as a single access point by which the client systems 120 may view that data. Such remote data stores are presumed to be slower in response to requests for that data than a local data store located within the data access system 102. In an example embodiment, the data to be accessed may include material master data, customer master data vendor master data, warehouse management master data, or any other data that may be employed for the selling, purchasing, and/or transferring of material stock, products, service, and the like. However, the data access system 102 may be configured to facilitate access by the client systems 120 to many other types of data aside from master data that may be located in one or more primary data source systems 110.

In an example embodiment, the data to be retrieved and accessed may be organized into a plurality of data records, with each record including multiple data fields that may describe corresponding aspects or characteristics of a particular product, service, material, and so on. For example, a data record for a light-emitting diode (LED) lamp may include a field for each of a product or SKU for the lamp, a manufacturing plant for the lamp, a location within the plant for that lamp, a gross weight of the lamp as packaged, a net weight of the lamp, a text description of the lamp, one or more still images of the lamp, a video demonstrating installation of the lamp, and so on. Data records for other products, materials, services, and so forth may include different numbers of fields, having differing types of data (e.g., numeric data, text data, image data, audio data, video data, etc.), and different sizes.

Example embodiments of the primary data source systems 110, as depicted in FIG. 1, may include a master data system 110A configured to store master data, as described above; an enterprise resource planning (ERP) system 110B to store data employed by that system; and other external data systems 110C. In example embodiments, each of the primary data source systems 110 may include one or more computing systems, such as server systems, data storage systems, and the like. Also in example embodiments, the data access system 102 may include one or more computer systems with one or more data storage systems that may operate as a cloud-based system or other online system with which the client systems 120 may communicate to access the data records originating in the primary data source systems 110. A particular example of the data access system 102 may be a business-to-business (B2B) system (e.g., a purchaser system, a customer system, a spend analysis system, a supply chain management system, etc.), such as SAP Ariba®, which may execute one or more applications for retrieving, presenting, analyzing, and/or other processing of data records.

In example embodiments, the client systems 120 may include desktop computers, laptop computers, tablet computers, smart phones, and other computing or communication devices. The client systems 120 may be communicatively coupled to the data access system 102 by way of one or more communication networks, such as a wide area network (WAN) (e.g., the Internet), a wireless WAN (WWAN), a local area network (LAN), a wireless LAN (WLAN), a cellular data network (e.g., a third-generation (3G) or fourth-generation (4G) network), another communication connection, and/or combinations thereof. The data access system 102 may also communicate with the primary data source systems 110 by way of similar communication networks or connections.

In some example embodiments, the client systems 120 may be configured to access the data access system 102 by way of a web browser, a dedicated client application (e.g., via an application programming interface (API)), or other means to retrieve and present data originating in the primary data source systems 110 to a user, such as by way of a graphical user interface (GUI).

Figure 2:
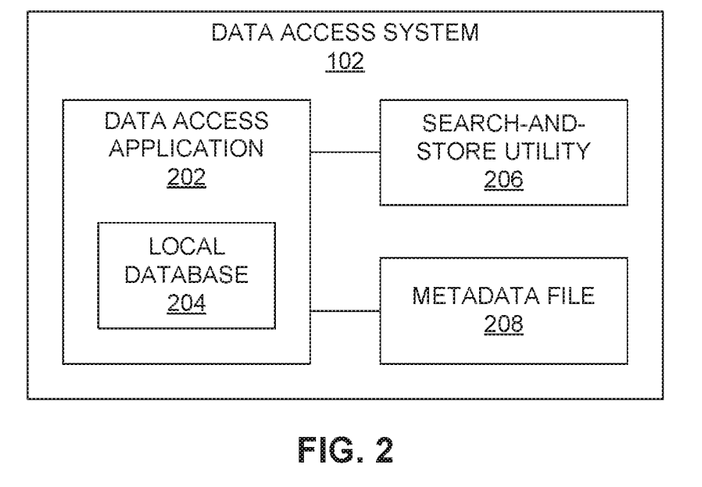
FIG. 2 is a block diagram of an example data access system of the example data storage and retrieval system of FIG. 1.

FIG. 2 is a block diagram of an example embodiment of the data access system 102 of the data storage and retrieval system 100 of FIG. 1. In this example embodiment, the data access system 102 may include a data access application 202 (which may include a local database 204), a search-and-store utility 206, and a metadata file 208. Other modules or components may be included in the data access system 102, but are not explicitly depicted in FIG. 2 to simplify and focus the following discussion. Also, in some example embodiments, the data access system 102 may include greater or fewer numbers of modules, some modules may be combined, and/or some modules may be divided into greater numbers of modules.

In an example embodiment, the data access application 202 may be configured to retrieve or access data records, including their constituent data fields, for subsequent presentation to users of the client systems 120. In an example embodiment, the data access application 202, may be an enterprise application (e.g., SAP Ariba®) configured to retrieve enterprise data (e.g., material master data, customer master data, vendor master data, warehouse management master data, or any other data that may be employed for the selling, purchasing, and/or transferring of material stock, products, service, and the like) from the primary data source systems 110 for transmission to the client systems 120 for presentation to users. In other example embodiments, the data access application 202 may be configured to access other types of data, such as employee data, sports information, historical data, or any other data that may be organized into records that include multiple fields.

In an example embodiment, the data access application 202 may include or access a local database 204 that may be configured to temporarily or permanently store the retrieved data records and/or individual data fields thereof after retrieval from the primary data source systems 110.

The data access system 102, in an example embodiment, may also include a search-and-store utility 206, such as a catalog search utility (e.g., SAP Ariba®, Arches) that may facilitate searching and retrieval of data records in response to requests received from the client systems 120. In some example embodiments, the search-and-store utility 206 may include an amount of data storage sufficient to store all "small" data fields of data records for which the data access system 102 is configured to access, as well as possibly some "large" fields of those records.

Figure 3:
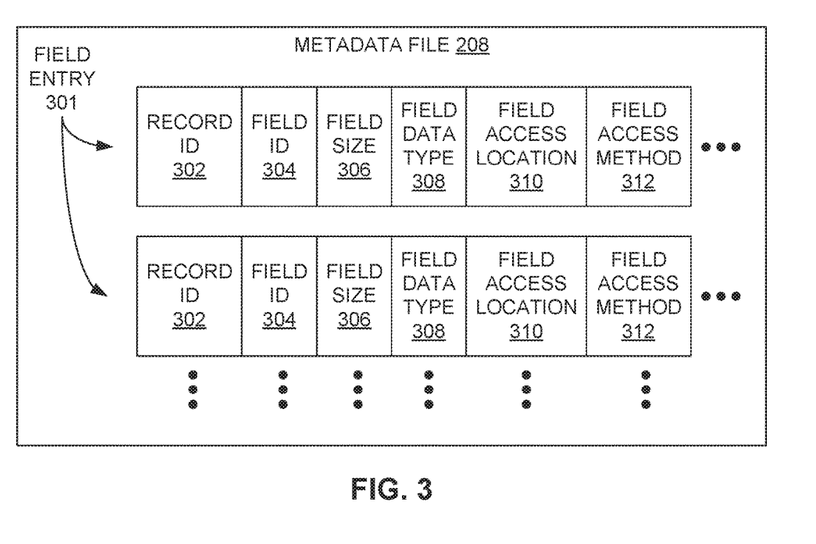
FIG. 3 is a block diagram of an example metadata file of the example data access system of FIG. 2.

In an example embodiment, the data access system 102 may also include a metadata file 208 configured to contain information regarding the size, data type, location, and/or other aspects of the data fields of the data records that may be accessed via the data access application 202. In some example embodiments, the metadata file 208 may be stored in a database, such as the local database 204, FIG. 3 is a block diagram of an example embodiment of the metadata file 208 of the data access system 102 of FIG. 2. In this example embodiment, each data field of each data record accessible via the data access application 202 may be represented with a corresponding field entry 301 stored in the metadata file 208. As illustrated in FIG. 2, one or more of the field entries 301 may include a record identifier 302, a field identifier 304, a field size 306, a field data type 308, a field access location 310, and a field access method 312, possibly along with additional information. In an example embodiment, the record identifier 302 may be an alphanumeric value uniquely identifying the particular data record in which the data field associated with the field entry 301 is located, and the field identifier 304 may be an alphanumeric value uniquely identifying the data field within the data record identified by the record identifier 302.

In an example embodiment, each field entry 301 may also include a field size 306 that indicates a size (e.g., in bytes, words, or other data storage increments) of the data field represented by the field entry 301. As is described in greater detail below, the size of each data field may at least in part determine whether the data field is initially retrieved from one of the primary data source systems 110 and stored within a local data store of the data access system 102 (e.g., within the local database 204 and/or the search-and-store utility 206) or is only retrieved from one of the primary data source systems 110 when explicitly requested, by the user, such as by way of a user interface presented by a client system 120, which may cause a request to be transmitted to the data access system 102.

In some example embodiments, each field entry 301 of the metadata file 208 may further include a field data type 308, a field access location 310, and/or a field access method 312. The field data type 308 may indicate the particular data type (e.g., text data, image data, audio data, video data, etc.), as well as the particular data format of the data field. The field access location 310 may indicate the particular current location (e.g., location within the local database 204 or the search-and-store utility 206) and/or original location (e.g., location within one of the primary data source systems 110) from where the data field may be accessed. The field access method 312 may indicate a particular method by which the data field may be retrieved, such as via transmission control protocol (TCP), user datagram protocol (UDP), file transfer protocol (FTP), and so on.

Figure 4:
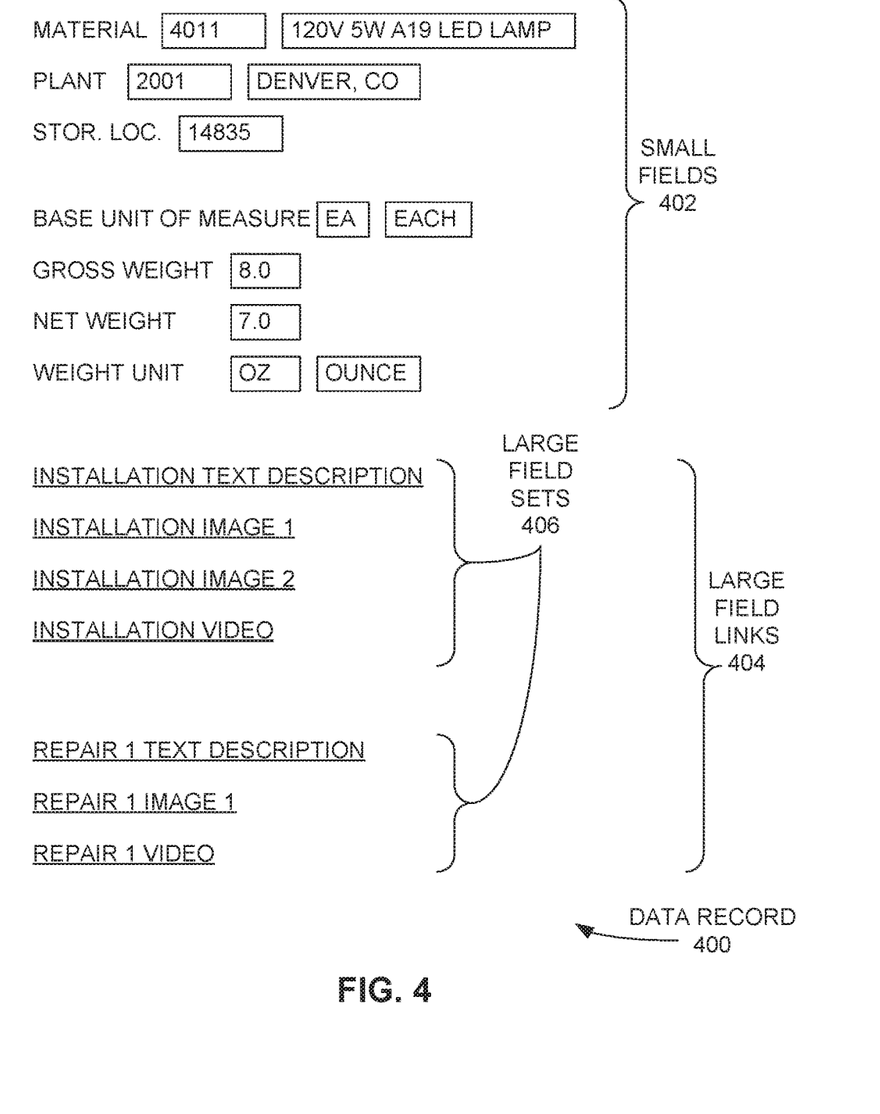
FIG. 4 is a graphical representation of an example user interface displaying multiple relatively large field links and small data fields of an example data record.

FIG. 4 is a graphical representation of an example user interface displaying multiple relatively "large" data field links 404 and "small" data fields 402 of an example data record 400. In this particular example, the data record 400 includes information related to an LED lamp, specifically a 120-volt (V), 5-watt (W) size A19 LED lamp. Additionally, the data record 400 is presented in FIG. 4 as it would be presented to a user via a user interface at a corresponding client system 120 at some point after a search or selection request of the data record 400 by the user. As depicted in FIG. 4, the small data fields 402 include a field for the particular material or product represented (e.g., material number 4011, a 120V, 5 W A10 LED lamp), the manufacturing plant that manufactured the lamp (e.g., plant number 2001, located in Denver, Colo.), and the storage location of the lamp at the plant (e.g., location number 14835). The small data fields 402 also include a base unit of measure (e.g., "each" or "ea.") of the product to which at least some of the other small fields 402 refer. Also included in the small data fields 402 is a weight unit (e.g., ounces, or "oz.") to be applied to other weight-specific fields of the small data fields 402. Accordingly, as designated in the small data fields 402. Referring to product weight, the gross weight (e.g., with packaging) of each lamp is 8.0 ounces, and the net weight of each lamp (e.g., without packaging) is 7.0 ounces.

In an example embodiment, the data for each of the small data fields 402 was previously retrieved prior to the user request for the data record 400, such as during an initial data-loading procedure, during which the data access application 202 issues one or more requests for the small data fields 402 to their corresponding primary data source systems 110. Such a procedure may be performed prior to the data access application 202 being made available to users of the client systems 120.

Also as illustrated in FIG. 4, the relatively "large" data fields, such as text descriptions, still images, audio or video clips, and the like, of the data record 400 may be represented as large data field links 404 (e.g., hyperlinks represented uniform resource locators (URLs)), as opposed to the particular descriptions, images, or clips themselves. In other example, icons or other graphical elements may be employed instead of the large data field links 404. In the particular example embodiment of FIG. 4, the large data field links 404 include links to each of a text description, first and second images, and an installation video. Further, when one of the large data field links 404 is selected (e.g., clicked or tapped) in the user interface by a user, the corresponding large data field, and possibly one or more other large data fields, may be retrieved from its associated primary data source system 110 and presented to the user via a client system 120 for presentation to the user via the user interface. For example, multiple large field links 404 may be organized into a single large field set 406. In FIG. 4, two such large field sets 406 (e.g., an installation set and a first repair set) are depicted, although greater or fewer numbers of large field sets 406, each including any number of large field links 404, may be included in the data record 400.

Consequently, the large data fields of the data record 400 may be accessed only in response to a specific user request for that large data field, or a request for another large data field of the same data record 400, such as the selection of another large data field link 404 of the same large field set 406. As a result of processing the data fields of a data record 400 in such a manner, overall communication bandwidth consumed by transfers between the data access system 102 and the primary data source systems 110 may be greatly reduced due to forestalling requests for the large data fields until specifically requested by users. Consequently, overall storage requirements of the data access system 102 may be decreased significantly, as many of the large data fields may not be requested by users of any of the client systems 120. Moreover, by requesting data in smaller increments, such as field-by-field, the corresponding data transfers from the primary data source systems 110 to the data access system 102 may be less error-prone.

Figure 5:
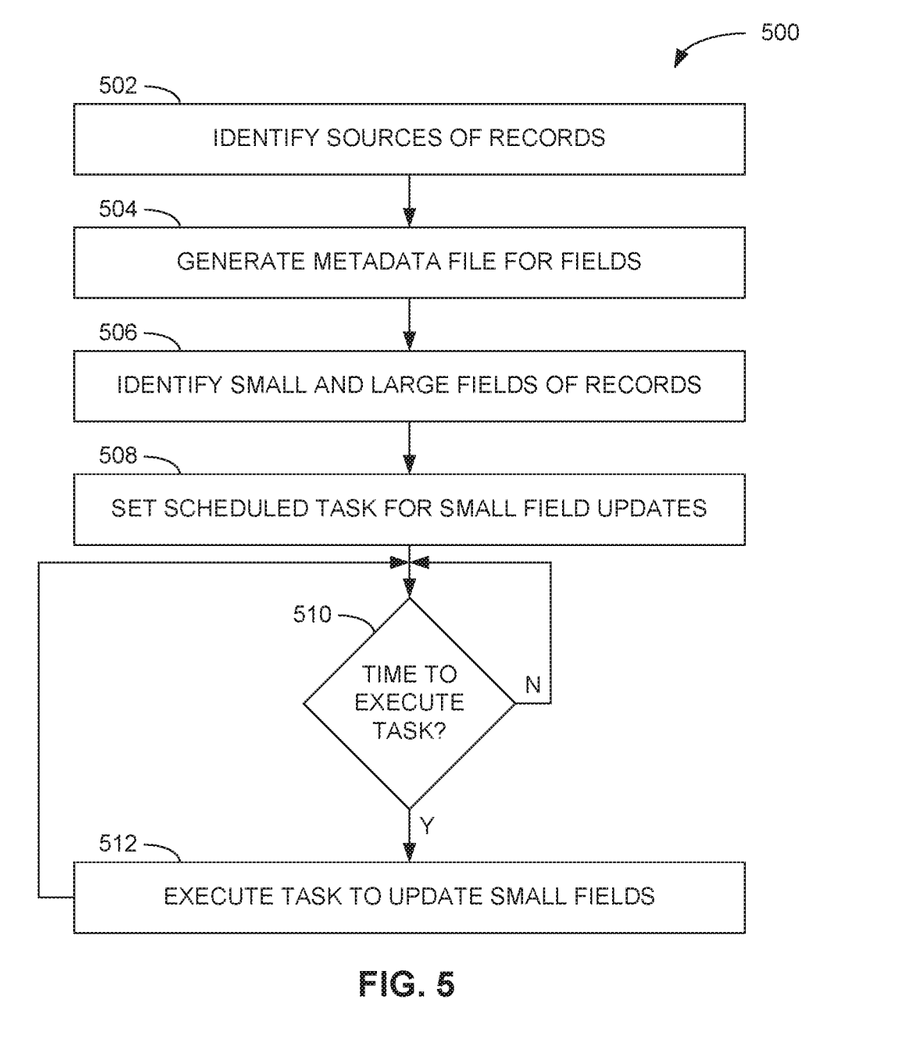
FIG. 5 is a flow diagram of an example method of identifying data field sources and retrieving relatively small ones of the data fields of a plurality of data records.

FIG. 5 is a flow diagram of an example method 500 of identifying data field sources and retrieving relatively small data fields (e.g., small data fields 402) of a plurality of data records (e.g., data records 400). While the method 500, as well as other methods described in greater detail below, are presented as being performed by one or more modules 202-208 of the data access system 102 of FIG. 2, systems or devices other than the data access system 102 may perform these methods in other example embodiments.

In the method 500, the data access system 102 (e.g., the data access application 202) may identify one or more primary data source systems 110 that store or contain the desired data records 400 to be made available to users of the client systems 120 (operation 502). In an example embodiment, the data access application 202 may be configured to access data records 400 of a particular data catalog or data system. In other example embodiments, the data access application 202 may receive information from a user of a client system 120, a system operator, or another person indicating the particular data records 400, or sets of data records 400, that are to be rendered accessible via the data access application 202.

Based on the identification of the particular data records 400 (operation 502), a metadata file (e.g., the metadata file 208) specifying the particular fields of each of the data records 400 may be generated (operation 504). In an example embodiment, the metadata file 208 may include information for each field, such as an identifier for the record in which the field is located, an identifier for the field, a size of the field, a data type for the field, an access location for the field, an access method for retrieving the field, and so on, as discussed above in conjunction with FIG. 3. In an example embodiment, at least some of this information may be based upon information received from one or more of the primary data source systems 110, from a system operator, or from another information source.

Based on the information in the metadata file 208, the data fields may be identified as either "small" or "large" (operation 506). In an example embodiment, the identification of a data field as small or large may depend primarily on information provided in the metadata file 208, such as a stated size (e.g., field size 306) (e.g., in bytes, words, or the like) of the data field. In one example, small fields are 512 bytes or smaller, while large data fields are larger than 512 bytes. In another example embodiment, the identification of a field as small or large may be based on the types of data (e.g., field data type 308), such as alphanumeric value, text data, image data, audio data, video data, and so on. In yet other examples, an identification of a field as small or large may depend on some other characteristic of the data field, or some combination of characteristics.

Based on the identification of large and small data fields, the data access application 202 may retrieve the small data fields 402 of the data records 400 from their corresponding primary data source systems 110 and store them locally to the data access application 202 (e.g., in the local database 204 of the data access application 202, or in the search-and-store utility 206). In an example embodiment, the data access application 202 may create or set a scheduled task to periodically retrieve and update the small data fields 402 of each data record 400 (operation 508). Based on the scheduled time arriving for the task to be executed (operation 510), the task may then execute to retrieve and store (or update) each of the small data fields 402 (operation 512). In an example embodiment, the data access application 202 may update the metadata file 208 to indicate the location in the local database 204 or the search-and-store utility 206 at which each copy of the small data fields 402 is located.

In FIG. 5, as well as in FIGS. 6 and 7 described below, while a particular order of execution is shown for the operations 502-512, other orders of execution are also possible, including possible simultaneous, concurrent, or overlapping execution of two or more of the operations 502-512. In an example embodiment, the data access application 202 may determine whether each data field is large or small based on information other than what is stored in the metadata file 208. Consequently, the identifying of the small and large data fields (operation 506) may occur prior to the generation of the metadata file 208 (operation 504).

Figure 6:
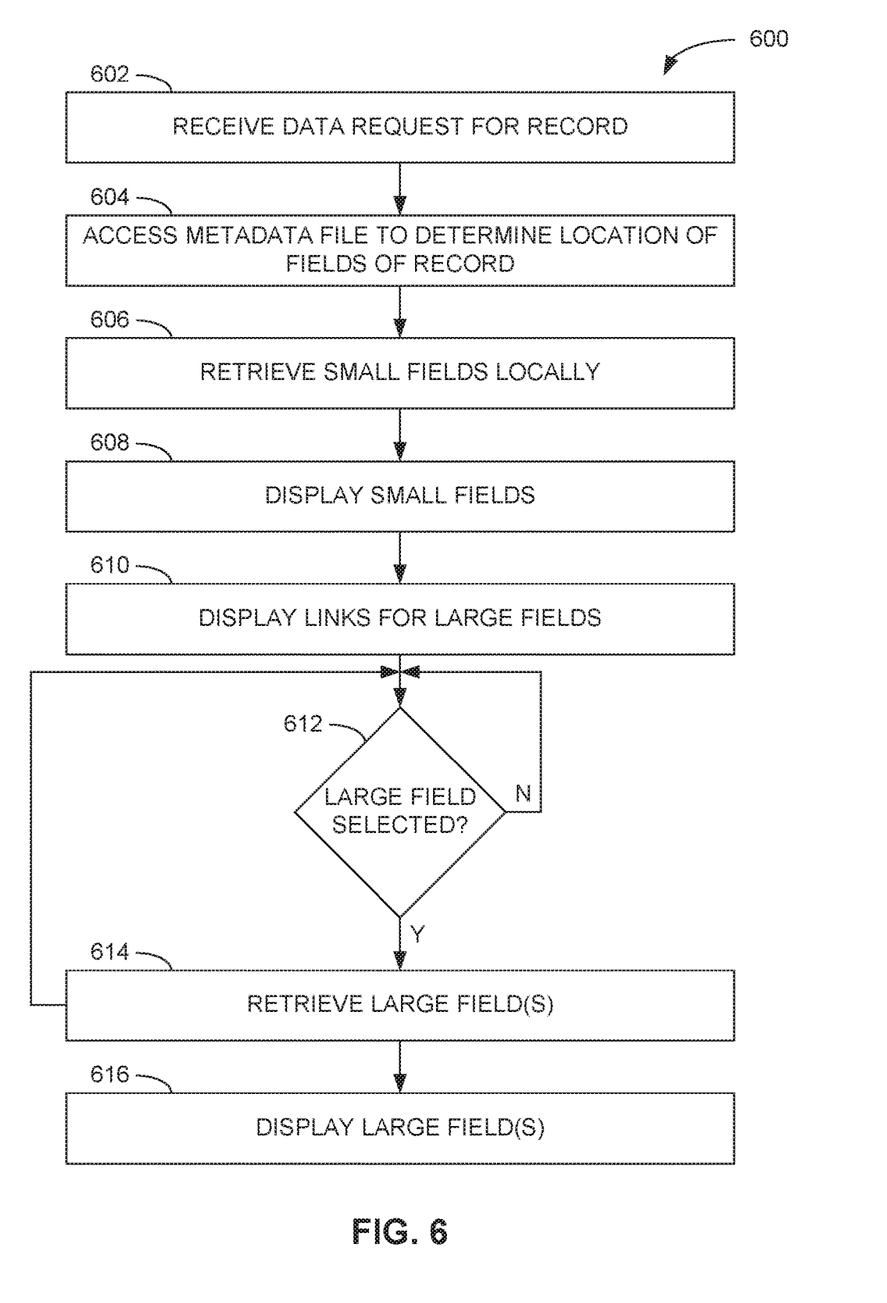
FIG. 6 is a flow diagram of an example method of responding to a user request for a data record, including retrieval and display of the data fields of the data record.

FIG. 6 is a flow diagram of an example method 600 of responding to a user request for a data record 400, including the retrieval and display of the data fields of the data record 400. In the method 600, the data access application 202 may receive a search or access request for one or more data records 400 (e.g., a data record denoting a particular material, product, or service) from one of the client systems 120 (e.g., initiated by a user via a user interface) (operation 602). In response to the request, the data access application 202 may access the metadata file 208 to determine the location at the data access system 102 (e.g., within the local database 204 or the search-and-store utility 206) of each of the small data fields 402 identified earlier (operation 604). Based on those determinations, the data access application 202 may then retrieve the small data fields 402 of the requested data record 400 from within the data access system 200 (operation 606) and cause the presentation of the small data fields 402 (operation 608), such as by transmitting the small data fields 402 to the client system 120 providing the request for presentation via a user interface to the user.

In an example embodiment, the data access application 202 may refrain from transmitting the large data fields of the data record 400 for presentation to the user at that time. Instead, the data access application 202 may cause the presentation of some representation of the large data field (operation 610), such as a large data field link 404. In an example embodiment, a single large data field link 404 (e.g., an HTTP hyperlink) may be presented for all of the large data fields of the data record 400, or a large data field link 404 may be presented for each large data field (e.g., as depicted in FIG. 4).

If a user is interested in viewing one of the large data fields, the user may select (e.g., click or tap) the large data field link 404 of interest (operation 612) in the user interface, which may result in an indication of the selection being transferred from the client system 120 to the data access system 200. In response to the selection, the data access application 202 may retrieve the large data field corresponding to the selected large data field link 404 (operation 614), as well as possibly one or more other large data fields of the same data record 400 (e.g., the other large data fields of the same large field set 406 that includes the selected large data field link 404), from the one or more primary data source systems 110 storing those data fields. The data access application 202 may then cause the presentation or display of those large data fields to the user (operation 616) by transmitting the large data fields to the client system 120 from which the link selection was received. In an example embodiment, the client system 120 receiving the large data fields may cause the presentation of the large data field in lieu of their associated large data field links 404.

Figure 7:
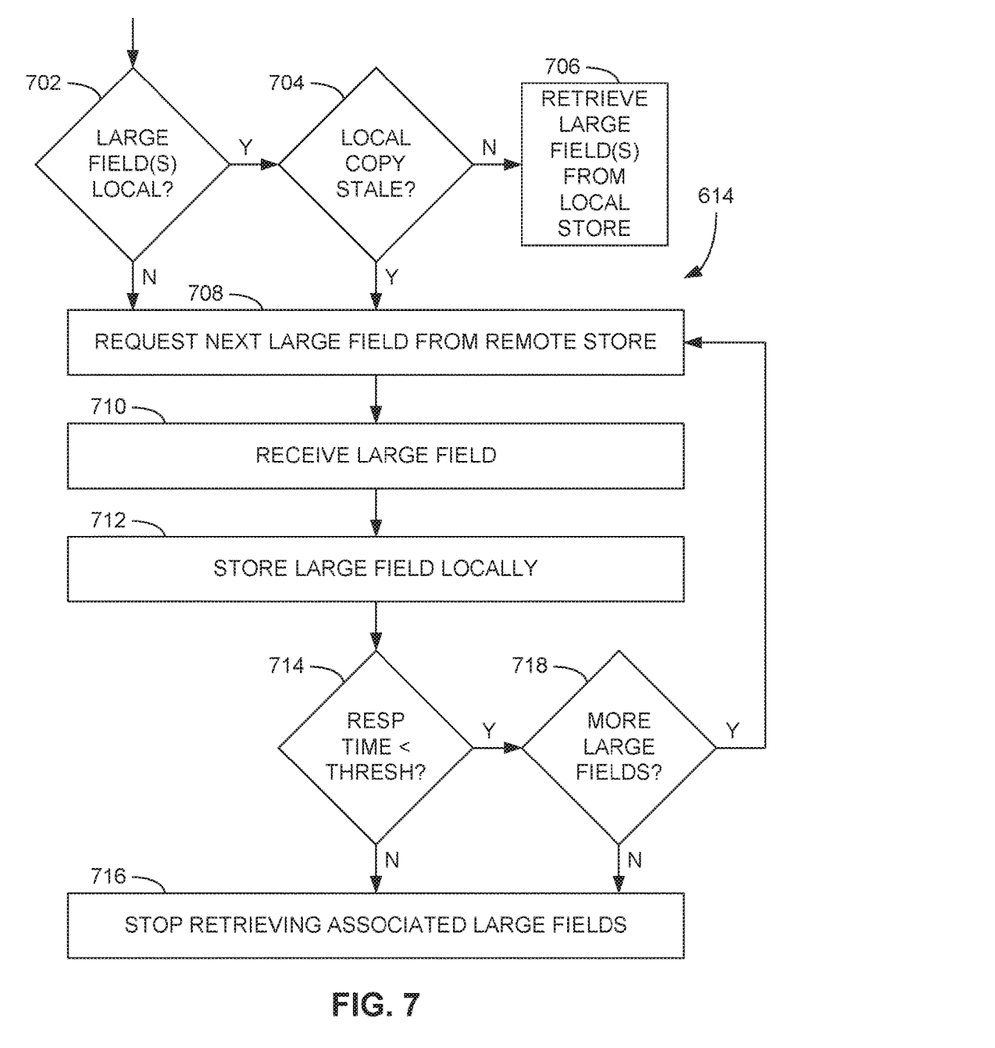
FIG. 7 is a flow diagram of an example method of retrieving relatively large fields of a data record.

FIG. 7 is a flow diagram of an example method of performing 614 of retrieving relatively large fields of a data record 400. In some example embodiments, the data access application 202 may store the large data fields retrieved from the one or more primary data source systems 110 locally within the data access system 200 (e.g., in the local database 204 or the search-and-store utility 206) to service subsequent requests for that data. In one example, each large data field stored locally may be associated with a time limit (e.g., 30 days), after which the large data field may be deleted from the local database 204 and/or the search-and-store utility 206 for being old or "stale." Thus, in an example embodiment, in response to a user selecting a large data field (e.g., via a large data field link 404 presented in the user interface), the data access application 202 may first determine whether the selected large data field is stored locally (operation 702) (e.g., such as by way of a database index or search) and whether such a copy may be stale (operation 704). If a copy of the large data field is located at the local database 204 or the search-and-store utility 206 (operation 702) and that copy is not stale (operation 704), the data access application 202 may retrieve that local copy (operation 706). Otherwise, the data access application 202 may request the large data field from the external primary data source system 110 storing that data field (operation 708), receive that large data field in response to the request (operation 710), and store the retrieved large data field in a local data store (e.g., at the local database 204 or the search-and-store utility 206) (operation 710).

In some example embodiments, to retrieve a large data field, the data access application 202 may issue a web service request. More specifically in an example embodiment, the data access application 202 may issue one or more representational transfer state (REST) API calls including identification and associated information corresponding to the large data field of the requested data record 400, such as one or more of a material identifier, a description identifier, a version number, locale information (e.g., localization information indicating a particular geographic area of the user), data format of the large data field (e.g., text, still image, audio, video, etc.), and the like. In some examples, this information may be retrieved at least in part from the metadata file 208. In an example embodiment, the REST API call may be issued to a web service hosted on the primary data source system 110 that stores the large data field. In response to the REST API call, the web service may process the REST API call and respond with the requested large data field to the data access application 202 issuing the call or request.

In an example embodiment, the data access application 202 may time multiple REST API calls (e.g., one or more API calls per large data field of a data record 400 being retrieved) based on the type of data being retrieved, the length of time to receive a response for one or more previous API calls, and potentially other factors. For example, the data access application 202 may initially request text data fields (e.g., typically smaller than still image data fields), followed by requesting still image data fields (e.g., typically smaller than video data fields), followed by requesting video data fields. By delaying the requests for the larger of the large data fields, such a strategy may facilitate the overall faster acquisition of at least some of those data fields.

More specifically in an example embodiment, the data access application 202 may request a large text data field in a first REST API call (operation 708). Presuming the maximum response time deemed acceptable by the data access application 202 is defined as x (e.g., some predetermined number of milliseconds) then if the response to the first API call for the text data field is less than some first threshold equal to a first percentage (e.g., 20%) of x (operation 714), the data access application 202 may proceed to issue a second REST API call to retrieve a still image data field (operation 708), presuming more large data fields are available (operation 718) (e.g., other large fields of the same large field set 406). If the response to the second API call for the image data field is less than some second threshold equal to some second percentage (e.g., 40%) of x (operation 714), the data access application 202 may then proceed to issue a third REST API call to retrieve video, audio, and/or other multimedia data fields (operation 708). Otherwise, if the response to the first or second REST API call exceeds its associated first or second threshold (operation 714), subsequent retrieving of the large data fields may be terminated (operation 716), thus possibly requiring the user to reinitiate retrieval of the large data fields by selecting another large data field link 404. In another example embodiment, the second and/or third REST API calls instead may be delayed. Consequently, by following such a strategy, the data access application 202, may dynamically adjust to continually changing communication network conditions, like network slowdowns, delayed server responses to the API calls, and poor overall quality of service (QoS), as well as automatically cater to low network bandwidth requirements.

In an example embodiment, to help ensure a copy of a large data field stored in a local data store at the data access system 200 is up-to-date, the primary data source system 110 providing a large data field in response to a REST API call may also generate and provide an entity tag (e.g., an ETag in a Hypertext Transfer Protocol (HTTP) header) transmitted with the large data field. The ETag may serve as an identifier a hash value generated from at least some portion of the large data field) for that particular version of the large data field. Consequently, the data access application 202, when thereafter requesting the same large data field, may provide the ETag with the corresponding REST API call. In response to this subsequent request, the primary data source system 110 may compare the received ETag with a corresponding ETag generated for the current version of the large data field stored at the primary data source system 110. If the received ETag and the corresponding ETag match, the primary data source system 110 may respond to the REST API call with a first code (e.g., HTTP status code 304, "Not Modified") indicating that the requested large data field has not been modified since the last request from the data access application 202, and thus need not be retransmitted to the data access application 202. If, instead, the received ETag and the corresponding ETag do not match, the primary data source system 110 may respond to the API call with a second code (e.g., HTTP status code 200, "OK") indicating the requested large data field has been updated since the last request, along with the updated large data field.

In an example embodiment, the data access application 202 may generate the request and process the corresponding response for the large data field a synchronously from other operations being executed within the data access application 202 to prevent the data access application 202 from stalling while awaiting the response. For example, in reaction to a user selection of the large data field, the data access application 202 may generate a separate execution thread from those already running to handle the request generation and/or response processing. In addition, in an example embodiment, the data access application 202 may communicate with the client system 120 to present to the user a user interface window (e.g., a web browser window) displaying to the user the progress of that processing and the returned large data field, with that window being separate from another user interface window used to display the small data fields 402.

In an example embodiment, a method for accessing data comprises receiving, at a computer system, a request for a data record comprising a plurality of data fields; accessing, at the computer system, a metadata file comprising location information for each of the plurality of data fields; retrieving from a local data store of the computer system, based on the location information and using at least one of one or more hardware processors of the computer system, each data field of a first portion of the plurality of data fields, each of the data fields of the first portion having a corresponding size less than a threshold size, the local data store providing a shorter response time than a remote data store sourcing the data fields of the first portion; causing presentation of each retrieved data field of the first portion; causing presentation of a field indicator for at least one data field of a second portion of the plurality of data fields, each of the data fields of the second portion having a corresponding size at least as large as the threshold size; receiving a selection of the field indicator; retrieving, in response to the selection of the field indicator, at least one data field of the second portion; and causing presentation of the retrieved at least one data field of the second portion.

In another example embodiment, including all previous example embodiments, the retrieving of the at least one data field of the second portion comprises determining whether the local data store includes the at least one data field of the second portion; retrieving, based on a determination that the local data store includes the at least one data field of the second portion, the at least one data field of the second portion from the local data store; and retrieving, based on a determination that the local data store does not include the at least one data field of the second portion, and based on the location information, the at least one data field of the second portion from the remote data store via a network.

In another example embodiment, including all previous example embodiments, the retrieving of the at least one data field of the second portion from the remote data store via the network comprises generating, and transmitting to the remote data store via the network, a representational state transfer (REST) application programming interface (API) web service request for one of the at least one data field of the second portion.

In another example embodiment, including all previous example embodiments, the retrieving of the at least one data field of the second portion from the remote data store via the network further comprises creating an execution thread separate from one or more execution threads previously created in an application receiving the selection of the field indicator.

In another example embodiment, including all previous example embodiments, the retrieving of the at least one data field of the second portion from the remote data store via the network further comprises creating a first user interface window for the presentation of the retrieved at least one data field of the second portion, the first user interface window being different from a second user interface window for the presentation of each retrieved data field of the first portion.

In another example embodiment, including all previous example embodiments, the retrieving of the at least one data field of the second portion from the remote data store via the network comprises generating, and transmitting to the remote data store via the network, a first Hypertext Transfer Protocol (HTTP) request for one of the at least one data field of the second portion; receiving, and storing in the local data store, the one of the at least one data field of the second portion in response to the first HTTP request; and receiving and storing a first HTTP entity tag corresponding to the one of the at least one data field of the second portion in response to the first HTTP request.

In another example embodiment, including all previous example embodiments, the method further comprises receiving a second selection of the field indicator; based on a determination that the local data store includes the one of the at least one data field of the second portion, generating, and transmitting to the remote data store, a second HTTP request for the one of the at least one data field of the second portion, the second HTTP request including the first HTTP entity tag; receiving, in response to the transmitting of the second HTTP request, an HTTP status code; retrieving from the remote data store, and storing in the local data store, in response to the HTTP status code indicating that the one of the at least one data field of the second portion has been updated, the one of the at least one data field of the second portion; and retrieving from the local data store, in response to the HTTP status code indicating that the one of the at least one data field of the second portion has not been updated, the one of the at least one data field of the second portion.

In another example embodiment, including all previous example embodiments, the retrieving of the at least one data field of the second portion from the remote data store comprises retrieving a first one of the at least one data field of the second portion; determining a first response time of the remote data store in the retrieving of the first one of the at least one data field of the second portion; and retrieving, based on the first response time being less than a first threshold value, a second one of the at least one data field of the second portion, the second one of the at least one data field of the second portion being larger than the first one of the at least one data field of the second portion.

In another example embodiment, including all previous example embodiments, the first threshold value is a first predetermined percentage of a maximum acceptable value for the first response time.

In another example embodiment, including all previous example embodiments, the first one of the at least one data field of the second portion comprises text data, and the second one of the at least one data field of the second portion comprises image data.

In another example embodiment, including all previous example embodiments, the method further comprises determining a second response time of the remote data store in the retrieving of the second one of the at least one data field of the second portion; and retrieving, based on the second response time being less than a second threshold value, a third one of the at least one data field of the second portion, the third one of the at least one data field of the second portion being larger than the second one of the at least one data field of the second portion.

In another example embodiment, including all previous example embodiments, the second threshold value is a second predetermined percentage of the maximum acceptable value for the first response time, the second threshold value being larger than the first threshold value.

In another example embodiment, including all previous example embodiments, the second one of the at least one data field of the second portion comprises image data, and the third one of the at least one data field of the second portion comprises at least one of audio data or video data.

In another example embodiment, including all previous example embodiments, the method further comprises, prior to the receiving of the request for the data record, identifying a remote data store of each of a plurality of data records, the plurality of data records comprising the requested data record; generating the metadata file based on the identifying of the remote data store for each of the plurality of data records; comparing, for each data field of each data record of the plurality of data records, a size of the data field to the threshold size; and retrieving each of the data fields having a size less than the threshold size from its identified remote data store to the local data store.

In another example embodiment, including all previous example embodiments, the method further comprises creating a scheduled task to update periodically each of the data fields having a size less than the threshold size from its corresponding remote data store.

In another example embodiment, including all previous example embodiments, the metadata file comprises field information for each data field of each data record of the plurality of data records, and the field information comprises at least one of a field identifier, a field data type, a field data size, a field data location, and a field access method.

In another example embodiment, including all previous example embodiments, the field indicator comprises a field link representing a uniform resource locator for accessing the at least one data field of the second portion.

In an example embodiment, a data access system comprises one or more hardware processors and a memory storing instructions that, when executed by at least one of the one or more hardware processors, cause the data access system to perform operations comprising receiving a request for a data record comprising a plurality of data fields; accessing, in response to the request, a metadata file comprising location information for each of the plurality of data fields; retrieving from a local data store of the data access system, based on the location information, each data field of a first portion of the plurality of data fields, each of the data fields of the first portion having a corresponding size less than a threshold size, the local data store providing a shorter response time than a remote data store sourcing the data fields of the first portion; causing presentation of each retrieved data field of the first portion; causing presentation of a field indicator for at least one data field of a second portion of the plurality of data fields, each of the data fields of the second portion having a corresponding size at least as large as the threshold size; receiving a selection of the field indicator; retrieving, in response to the selection of the field indicator, at least one data field of the second portion; and causing presentation of the retrieved at least one data field of the second portion.

In another example embodiment, including all previous example embodiments, the retrieving of the at least one data field of the second portion comprises determining whether the local data store includes the at least one data field of the second portion; retrieving, based on a determination that the local data store includes the at least one data field of the second portion, the at least one data field of the second portion from the local data store; and retrieving, based on a determination that the local data store does not include the at least one data field of the second portion, and based on the location information, the at least one data field of the second portion from the remote data store via a network.

In an example embodiment, a non-transitory computer-readable storage medium stores instructions that, when executed by one or more processors of a machine, cause the machine to perform operations comprising receiving a request for a data record comprising a plurality of data fields; accessing, in response to the request, a metadata file comprising location information for each of the plurality of data fields; retrieving from a local data store based on the location information, each data field of a first portion of the plurality of data fields, each of the data fields of the first portion having a corresponding size less than a threshold size, the local data store providing a shorter response time than a remote data store sourcing the data fields of the first portion; causing presentation of each retrieved data field of the first portion; causing presentation of a field indicator for at least one data field of a second portion of the plurality of data fields, each of the data fields of the second portion having a corresponding size at least as large as the threshold size; receiving a selection of the field indicator; retrieving, in response to the selection of the field indicator, at least one data field of the second portion; and causing presentation of the retrieved at least one data field of the second portion.

Figure 8:
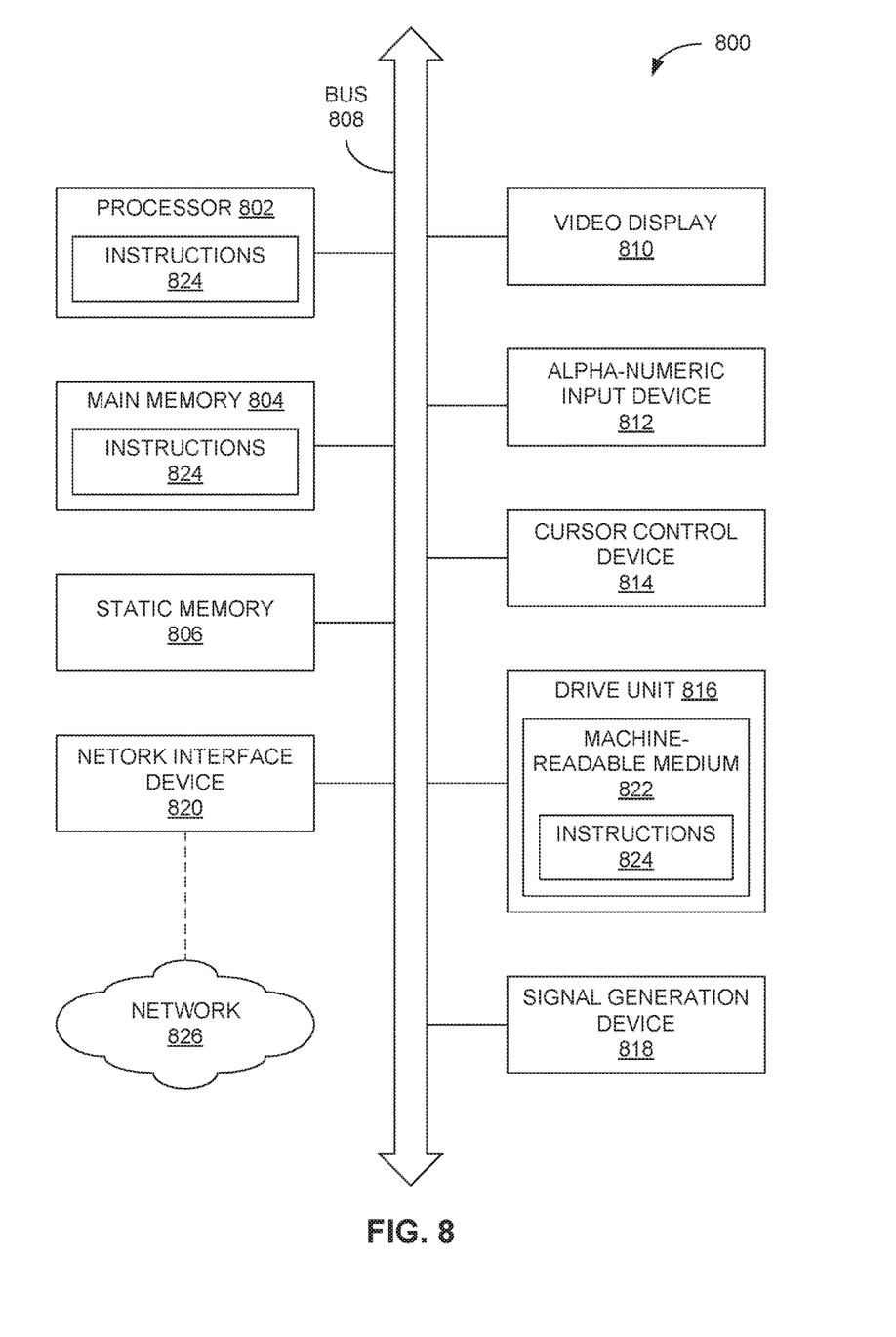
FIG. 8 is a block diagram of a computer processing system within which a set of instructions may be executed for causing a computer to perform any one or more of the methodologies discussed herein.

FIG. 8 is a block diagram of a computer processing system 800 within which a set of instructions 824 may be executed for causing a computer to perform any one or more of the methodologies discussed herein, such as those discussed in conjunction with FIGS. 5-7, as well as other methodologies discussed herein. In some embodiments, the computer operates as a standalone device or may be connected (e.g., networked) to other computers. In a networked deployment, the computer may operate in the capacity of a server or a client computer in a server-client network environment, or as a peer computer in a peer-to-peer (or distributed) network environment. Moreover, the computer processing system 800 may serve in example embodiments as, for example, the data access system 102 of FIGS. 1 and 2, as well as any component or module 202-208 described therewith.

In addition to being sold or licensed via traditional channels, embodiments may also be deployed, for example, by software-as-a-service (SaaS) providers, application service providers (ASPS), or by utility computing providers. The computer may be a server computer, a personal computer (PC), a tablet PC, a personal digital assistant (PDA), a cellular telephone, or any processing device capable of executing a set of instructions (sequential or otherwise) that specify actions to be taken by that device. Further, while only a single computer is illustrated, the term "computer" shall also be taken to include any collection of computers that, individually or jointly, execute a set (or multiple sets) of instructions to perform any one or more of the methodologies discussed herein.

The example computer processing system 800 includes a processor 802 (e.g., a central processing unit (CPU), a graphics processing unit (GPU), or both), a main memory 804, and a static memory 806, which communicate with each other via a bus 808. The computer processing system 800 may further include a video display 810 (e.g., a plasma display, a liquid crystal display (LCD), or a cathode ray tube (CRT)). The computer processing system 800 also includes an alphanumeric input device 812 (e.g., a keyboard), a user interface (UI) cursor control device 814 (e.g., a mouse and/or touch screen), a drive unit 816, a signal generation device 818 (e.g., a speaker), and a network interface device 820.

The drive unit 816 includes a machine-readable medium 822 on which is stored one or more sets of instructions 824 and data structures embodying or utilized by any one or more of the methodologies or functions described herein. The instructions 824 may also reside, completely or at least partially, within the main memory 804, the static memory 806, and/or the processor 802 during execution thereof by the computer processing system 800, with the main memory 804, the static memory 806, and the processor 802 also constituting tangible machine-readable media 822.

The instructions 824 may further be transmitted or received over a network 826 via the network interface device 820 utilizing any one of a number of well-known transfer protocols (e.g., Hypertext Transfer Protocol).

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions 824. The term "machine-readable medium" shall also be taken to include any medium that is capable of storing, encoding, or carrying a set of instructions 824 for execution by the computer and that cause the computer to perform any one or more of the methodologies of the present application, or that is capable of storing, encoding, or carrying data structures utilized by or associated with such a set of instructions 824. The term "machine-readable medium" shall accordingly be taken to include, but not be limited to, solid-state memories, optical and magnetic media, and other non-transitory media.

While the example embodiments discussed herein are described with reference to various implementations and exploitations, these example embodiments are illustrative, and the scope of the disclosure is not so limited. In general, techniques for maintaining consistency between data structures may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are possible and may fall within a scope of various embodiments of the present disclosure. In general, structures and functionality presented as separate components in the exemplary configurations may be implemented as a combined structure or component. Similarly, structures and functionality presented as a single component may be implemented as separate components. These and other variations, modifications, additions, and improvements fall within a scope of embodiments of the present disclosure as represented by the appended claims.

What is claimed is:

1. A method for accessing data, the method comprising:
receiving, at a computer system, a request from a client system for a data record comprising a plurality of data fields;
accessing, at the computer system, a metadata file comprising location information for each data field of the plurality of data fields;
retrieving from a local data store of the computer system, based on the location information and using at least one of one or more hardware processors of the computer system, each data field of a first portion of the plurality of data fields, each data field of the data fields of the first portion having a corresponding size less than a threshold size, the local data store providing a shorter response time than a remote data store sourcing the data fields of the first portion;
transmitting each data field of the first portion of the plurality of data fields to the client system while refraining from transmitting each data field of a second portion of the plurality of data fields to the client system, each data field of the data fields of the second portion having a corresponding size at least as large as the threshold size;
causing presentation of each retrieved data field of the first portion in a user interface of the client system;

causing presentation of a field indicator for at least one data field of a second portion of the plurality of data fields in the user interface of the client system;
receiving a selection of the field indicator from the client system; and
in response to the selection of the field indicator, retrieving a first one of the at least one data field of the second portion from a remote data store and, based on a first response time associated with retrieving the first one of the least one data field of the second portion from the remote data store being less than a first threshold value, retrieving a second one of the at least one data field of the second portion from the remote data store, transmitting the first one of the at least one data field of the second portion to the client system; and
causing presentation of the at least one data field of the second portion in the user interface of the client system in lieu of the field indicator.

2. The method of claim 1, wherein the retrieving of the at least one data field of the second portion from the remote data store is based on a determination that the local data store does not include the at least one data field of the second portion.

3. The method of claim 2, the retrieving of the at least one data field of the second portion from the remote data store via the network comprising generating and transmitting to the remote data store via the network, a representational state transfer (REST) application programming interface (API) web service request for one of the at least one data field of the second portion.

4. The method of claim 3, the retrieving of the at least one data field of the second portion from the remote data store via the network further comprising creating an execution thread separate from one or more execution threads previously created in an application receiving the selection of the field indicator.

5. The method of claim 3, the retrieving of the at least one data field of the second portion from the remote data store via network further comprising creating a first user interface window for presentation of the retrieved at least one data field of the second portion, the first user interface window being different from a second user interface window for presentation of each retrieved data field of the first portion.

6. The method of claim 2, the retrieving of the at least one data field of the second portion from the remote data store via network comprising:
generating, and transmitting to the remote data store via the network, a first Hypertext Transfer Protocol (HTTP) request for one of the at least one data field of the second portion;
receiving, and storing in the local data store, one of the at least one data field of the second portion in response to the first HTTP request; and
receiving and storing a first HTTP entity tag corresponding to the one of the at least one data field of the second portion in response to the first HTTP request.

7. The method of claim 6, further comprising:
receiving a second selection of the field indicator;
based on a determination that the local data store includes the one of the at least one data field of the second portion, generating, and transmitting to the remote data store, a second HTTP request for the one of the at least one data field of the second portion, the second HTTP request including the first HTTP entity tag;
receiving, in response to the transmitting of the second HTTP request, an HTTP status code;
retrieving from the remote data store, and storing in the local data store, in response to the HTTP status code indicating that the one of the at least one data field of the second portion has been updated, the one of the at least one data field of the second portion; and
retrieving from the local data store, in response to the HTTP status code indicating that the one of the at least one data field of the second portion has not been updated, the one of the at least one data field of the second portion.

8. The method of claim 2, the second one of the at least one data field of the second portion being larger than first one of the at least one data field of the second portion.

9. The method of claim 8, the first threshold value being a first predetermined percentage of a maximum acceptable value for the first response time.

10. The method of claim 9, the first one of the at least one data field of the second portion comprising text data, and the second one of the at least one data field of the second portion comprising image data.

11. The method of claim 9, further comprising: determining a second response time of the remote data store in the retrieving of the second one of the at least one data field of the second portion; and retrieving, based on the second response time being less than a second threshold value, a third one of the at least one data field of the second portion, the third one of the at least one data field of the second portion being larger than the second one of the at least one data field of the second portion.

12. The method of claim 11, the second threshold value being a second predetermined percentage of the maximum acceptable value for the first response time, the second threshold value being larger than the first threshold value.

13. The method of claim 11, the second one of the at least one data field of the second portion comprising image data, and the third one of the at least one data field of the second portion comprising at least one of audio data or video data.

14. The method of claim 2, further comprising: prior to the receiving of the request for the data record: identifying a remote data store of each data record of a plurality of data records, the plurality of data records comprising the requested data record;
generating the metadata file based on identifying of the remote data store for each data record of the plurality of data records;
comparing, for each data field of each data record of the plurality of data records, a size of the data field to the threshold size; and
retrieving each data field of the data fields having a size less than the threshold size from identified remote data store to the local data store.

15. The method of claim 14, further comprising: creating a scheduled task to update periodically each data field of the data fields having a size less than the threshold size from its corresponding remote data store.

16. The method of claim 14, the metadata file comprising field information for each data field of each data record of the plurality of data records, the field information comprising at least one of a field identifier, a field data type, a field data size, a field data location, and a field access method.

17. The method of claim 1, the field indicator comprising a field link representing a uniform resource locator for accessing the at least one data field of the second portion.

18. A data access system comprising:
one or more hardware processors; and a memory storing instructions that, when executed by at least one of the one or more hardware processors, cause the data access system to perform operations comprising:

receiving a request from a client system for a data record comprising a plurality of data fields;

accessing, in response to the request, a metadata file comprising location information for each data field of the plurality of data fields;

retrieving from a local data store of the data access system, based on the location information, each data field of a first portion of the plurality of data fields, each data field of the data fields of the first portion having a corresponding size less than a threshold size, the local data store providing a shorter response time than a remote data store sourcing the data fields of the first portion;

transmitting each data field of the first portion of the plurality of data fields to the client system while refraining from transmitting each data field of a second portion of the plurality of data fields to the client system, each data field of the data fields of the second portion having a corresponding size at least as large as the threshold size;

causing presentation of each retrieved data field of the first portion in a user interface of the client system;

causing presentation of a field indicator for at least one data field of a second portion of the plurality of data fields in the user interface of the client system;

receiving a selection of the field indicator from the client system;

in response to the selection of the field indicator, retrieving a first one of the at least one data field of the second portion from a remote data store and, based on a first response time associated with retrieving the first one of the least one data field of the second portion from the remote data store being less than a first threshold value, retrieving a second one of the at least one data field of the second portion from the remote data store, and transmitting the first one of the at least one data field of the second portion to the client system; and causing presentation of the at least one data field of the second portion in the user interface of the client system in lieu of the field indicator.

19. The data access system of claim 18, the retrieving of the at least one data field of the second portion comprising: determining whether the local data store includes the at least one data field of the second portion; retrieving, based on a determination that the local data store includes the at least one data field of the second portion, the at least one data field of the second portion from the local data store; and retrieving, based on a determination that the local data store does not include the at least one data field of the second portion, and based on the location information, the at least one data field of the second portion from the remote data store via a network.

20. A non-transitory computer-readable storage medium storing instructions that, when executed by one or more processors of a computer system, cause the computer system to perform operations comprising:

receiving a request from a client system for a data record comprising a plurality of data fields;

accessing, in response to the request, a metadata file comprising location information for each data field of the plurality of data fields;

retrieving from a local data store based on the location information, each data field of a first portion of the plurality of data fields, each data field of the data fields of the first portion having a corresponding size less than a threshold size, the local data store providing a shorter response time than a remote data store sourcing the data fields of the first portion;

transmitting each data field of the first portion of the plurality of data fields to the client system while refraining from transmitting each data field of a second portion of the plurality of data fields to the client system, each data field of the data fields of the second portion having a corresponding size at least as large as the threshold size;

causing presentation of each retrieved data field of the First portion in a user interface of the client system;

causing presentation of a field indicator for at least one data field of a second portion of the plurality of data fields in the user interface of the client system;

receiving a selection of the Field indicator from the client system;

in response to the selection of the field indicator, retrieving a first one of the at least one data field of the second portion from a remote data store and, based on a first response time associated with retrieving the first one of the least one data field of the second portion from the remote data store being less than a first threshold value, retrieving a second one of the at least one data field of the second portion from the remote data store, transmitting the first one of the at least one data field of the second portion to the client system; and causing presentation of the at least one data Field of the second portion in the user interlace of the client system in lieu of the field indicator.

* * * * *